US006725634B1

(12) United States Patent
Palmqvist et al.

(10) Patent No.: US 6,725,634 B1
(45) Date of Patent: Apr. 27, 2004

(54) COUNTER RAIL AND COUNTER ELEMENT IN A SEALING APPARATUS AND METHOD OF MANUFACTURING THEREOF (75) Inventors: Roland Palmqvist, Åkarp (SE); Martin Martell, Kävlinge (SE); Ebi Shokri, Vallentuna (SE); Maurizio Mazzetto, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/889,669
(22) PCT Filed: Jan. 26, 2000
(86) PCT No.: PCT/SE00/00152
§ 371 (c)(1),
(2), (4) Date: Sep. 4, 2001
(87) PCT Pub. No.: WO00/44625
PCT Pub. Date: Aug. 3, 2000

(30) Foreign Application Priority Data

Feb. 1, 1999 (SE) .............................. 9900347

(51) Int. Cl.⁷ .............................................. B65B 47/02
(52) U.S. Cl. .............................. 53/548; 53/563; 53/565
(58) Field of Search ............................ 53/373.6, 373.7, 53/374.3, 548, 552, 563, 565, 370.7, 371.2–371.9, 374.2–374.9

(56) References Cited

U.S. PATENT DOCUMENTS 3,464,091 A * 9/1969 Bielfeldt .................... 425/574
3,752,725 A    8/1973 Freeman
3,753,829 A * 8/1973 Freeman .................... 156/367
4,093,500 A    6/1978 Browne
4,512,138 A * 4/1985 Greenawalt ................. 53/451
5,208,083 A * 5/1993 Freed ....................... 428/36.7
5,678,392 A * 10/1997 Konno ..................... 53/373.7
5,787,690 A * 8/1998 Konno ..................... 53/373.7
5,953,884 A * 9/1999 Lawecki et al. ............. 141/11
6,216,420 B1 * 4/2001 Mazzetto et al. .......... 53/373.7
6,260,336 B1 * 7/2001 Motomura .................. 53/551

FOREIGN PATENT DOCUMENTS

| DE | 2 245 394 | 3/1974 |
| EP | 0 703 946 A3 | 4/1996 |
| EP | 0 706 945 | 4/1996 |
| EP | 0 730 946 A2 | 9/1996 |

* cited by examiner

Primary Examiner—Scott A. Smith
Assistant Examiner—Chukwurah Nathaniel
(74) Attorney, Agent, or Firm—Burns, Doane, Swecker & Mathis, L.L.P.

(57) ABSTRACT

The present invention relates to a counter rail and a dolly, suitable for use in an apparatus for heat sealing a laminated packaging material for packaging of a liquid or flowing product, wherein the counter rail and the dolly each are made of a substantially plastics material. The invention also relates to an apparatus for heat sealing and to a sealing/cutting apparatus including said counter rail and dolly, as well as to a packaging machine including such a sealing apparatus and counter rail and dolly of the invention. Furthermore, the invention relates to a method of producing said counter rail and dolly by means of co-injection molding.

20 Claims, 7 Drawing Sheets

COUNTER RAIL AND COUNTER ELEMENT IN A SEALING APPARATUS AND METHOD OF MANUFACTURING THEREOF

FIELD OF THE INVENTION

The present invention relates to a counter rail and to a combination module of a counter rail and a dolly respectively, suitable for use in an apparatus for heat sealing a laminated packaging material for packaging of a liquid or flowing product.

The invention also relates to an apparatus for heat sealing and to a sealing/cutting apparatus including said counter rail and dolly, as well as to a packaging machine including such a sealing apparatus and counter rail and dolly of the invention.

Furthermore, the invention relates to a method of producing said counter rail and dolly.

BACKGROUND OF THE INVENTION

Figure 1A:
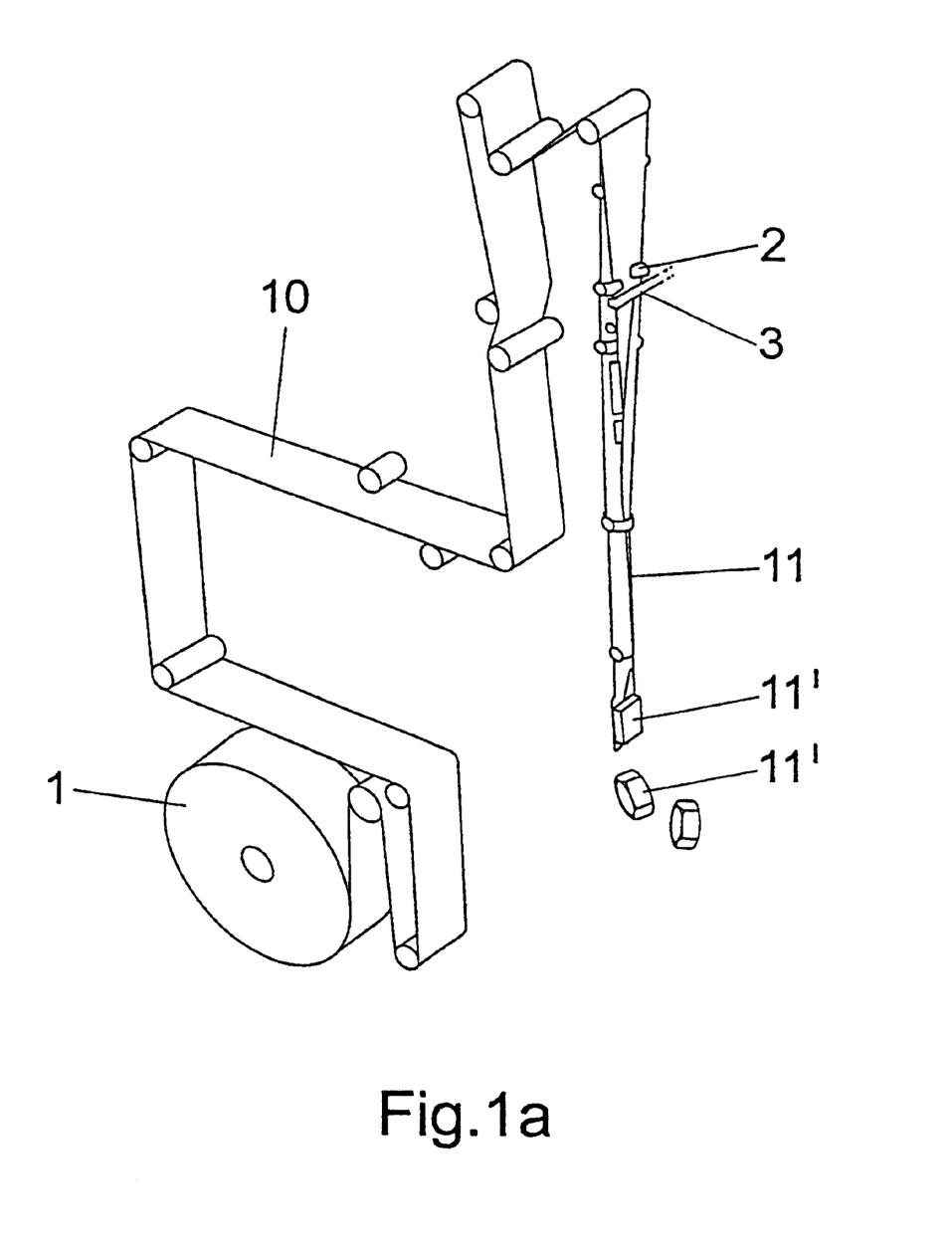
FIG. 1a schematically illustrates the conventional process of forming a tube from a continuous web of packaging material and the further formation of packaging containers, involving a step of transversal sealing in which the sealing apparatus according to the invention is employed, FIG. 1b schematically illustrates the conventional process of forming packages from pre-cut blanks of packaging material, FIG. 2 schematically illustrates a cross-sectional side view of a part of a conventional sealing apparatus, i.e. a counter rail provided with a dolly facing a sealing block on the opposite side of the packaging material, in an initial stage of the operation of creating a transversal seal, while FIG. 3 schematically shows the same conventional counter rail and dolly arrangement as in FIG. 2, in a final stage of the sealing operation, FIG. 4 schematically illustrates a side view, partially in section, of an example of a sealing and cutting apparatus of the present invention during use.

Food packaging processes of today (with the term "food" is meant all sorts of solid and liquid food, such as juices, milk and other beverages as well as pastes, soups, jellies and cheese) often are of the type "form-fill-seal" and may be carried out by shaping a continuously moving web-shaped packaging material made of a flexible laminate into a continuously running tube, continuously filling the tube with the desired food product to be packaged and by sealing and finally cutting off sealed packages from the tube. An example of such forming of a tube from a continuous web of packaging material and the further formation of packaging containers is schematically shown in FIG. 1a.

The packaging processes are often high speed continuous processes, wherein the packaging material in the form of a web is continuously fed through a machine, sterilised, for example by passing through a liquid or gas-phase quick-acting sterilising medium, formed and sealed into the required tube-shape for being filled with the food to be packaged and finally transversally sealed.

The continuous web-shaped packaging material is manufactured with a packaging material manufacturing machine and placed on a reel. The packaging material often has a laminated structure comprising a core layer of paper or paperboard, an outer heat sealing layer of a thermoplastic polymer (such as for example polyethylene) on each side of the core layer and, if necessary, an aluminium foil gas-barrier layer interposed between the paper core layer and the film. Alternatively, a gas-barrier layer of a plastics or inorganic material, such as for example polyamide, polyethylene vinylalcohol (EVOH) or siliconoxide, may be employed instead of aluminium foil.

The reel with packaging material is installed in the packaging machine where it is reeled out and routed within the packaging machine using drive mechanisms disposed in several positions in the machine. The packaging material web is shaped into a tube and sealed in the longitudinal direction within the packaging machine. While the tube is being transferred downward within the packaging machine, the liquid or flowing food product is supplied from above to fill the inside of the tubular packaging material. Next, the packaging material tube is squeezed laterally from both sides and sealed in the lateral direction at specified intervals to form interconnected, filled and sealed packaging containers. Next, the sealed packaging containers are separated off from the tube by cutting between the laterally extending sealed portions, and the thus separated packaging containers are brought into a specified, desired shape, for example by folding and bending along previously formed crease lines in the packaging material, and, if required, finally sealed in order to remain in that shape.

The sealing of the tubular packaging material in the longitudinal or lateral direction is carried out by heat sealing of the outer surfaces of the packaging material, which are made of heat sealing thermoplastics, to each other. This may be performed by known heat sealing techniques, such as for example induction heat sealing, radio frequency (RF) or microwave heat sealing, heat convection sealing or ultrasonic vibration heat sealing. A very common heat sealing technique today for the transversal heat seals in the case of aseptic packaging, is the induction heat sealing, wherein the aluminium foil in the packaging laminate co-acts with an inductor in order to generate heat. The thermoplastic surfaces are bonded to each other by heat fusion by simultaneous application of the induction current and pressure.

Figure 1B:
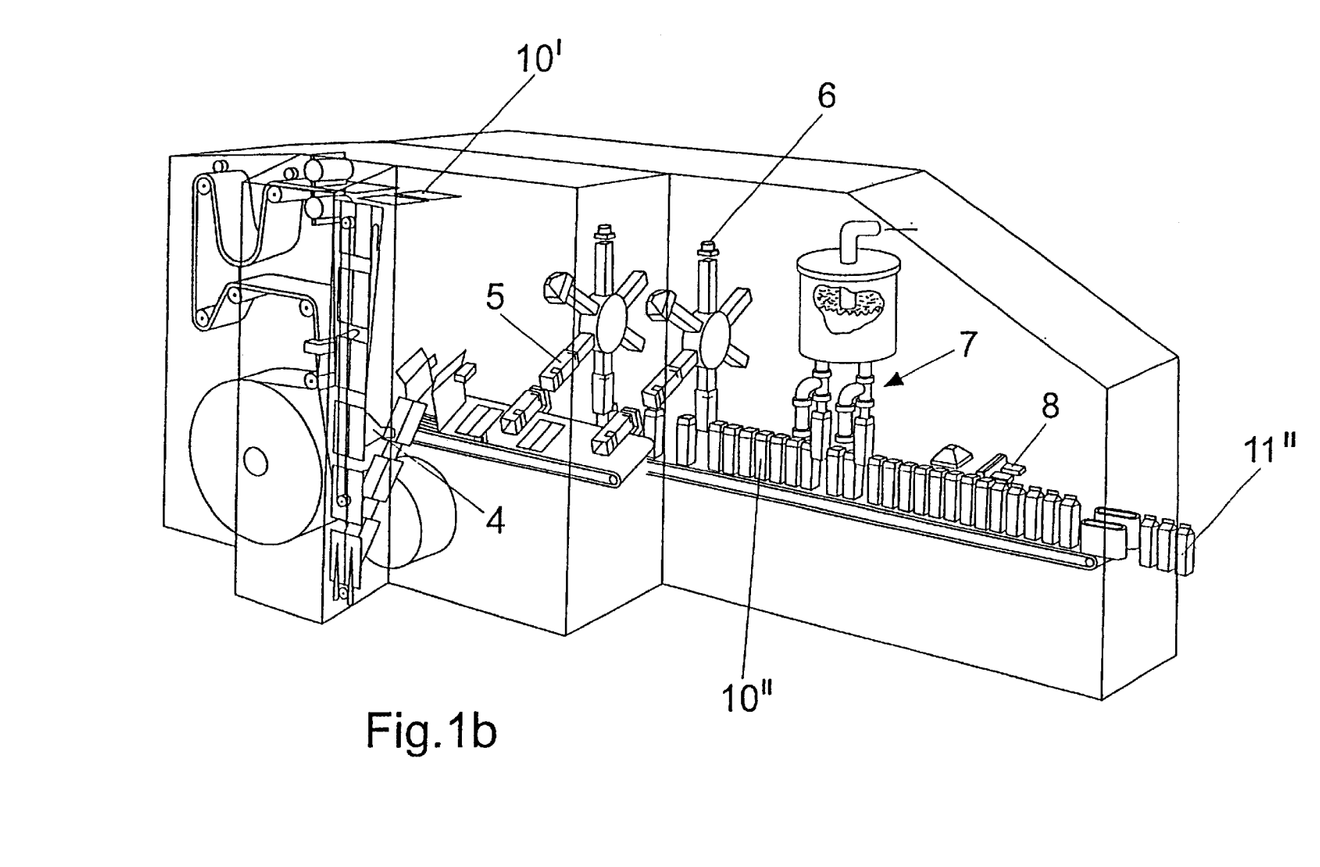

Alternatively, packaging processes may often be of the type that are forming packages from pre-cut blanks of packaging material. An example of a principle for such 6 packaging process is shown in FIG. 1b.

Pre-cut blanks of packaging material may be fed into a packaging machine, folded and longitudinally sealed, fold-formed and sealed at the bottom in order to provide open package capsules. The capsules are filled and subsequently sealed at the top, thus providing filled packages (11").

Conventional packaging machines thus employ a heat sealing apparatus to seal the packaging material. The sealing apparatus is normally provided with so-called counter jaws and heat seal jaws disposed and working in opposing relation to each other.

Figure 4:
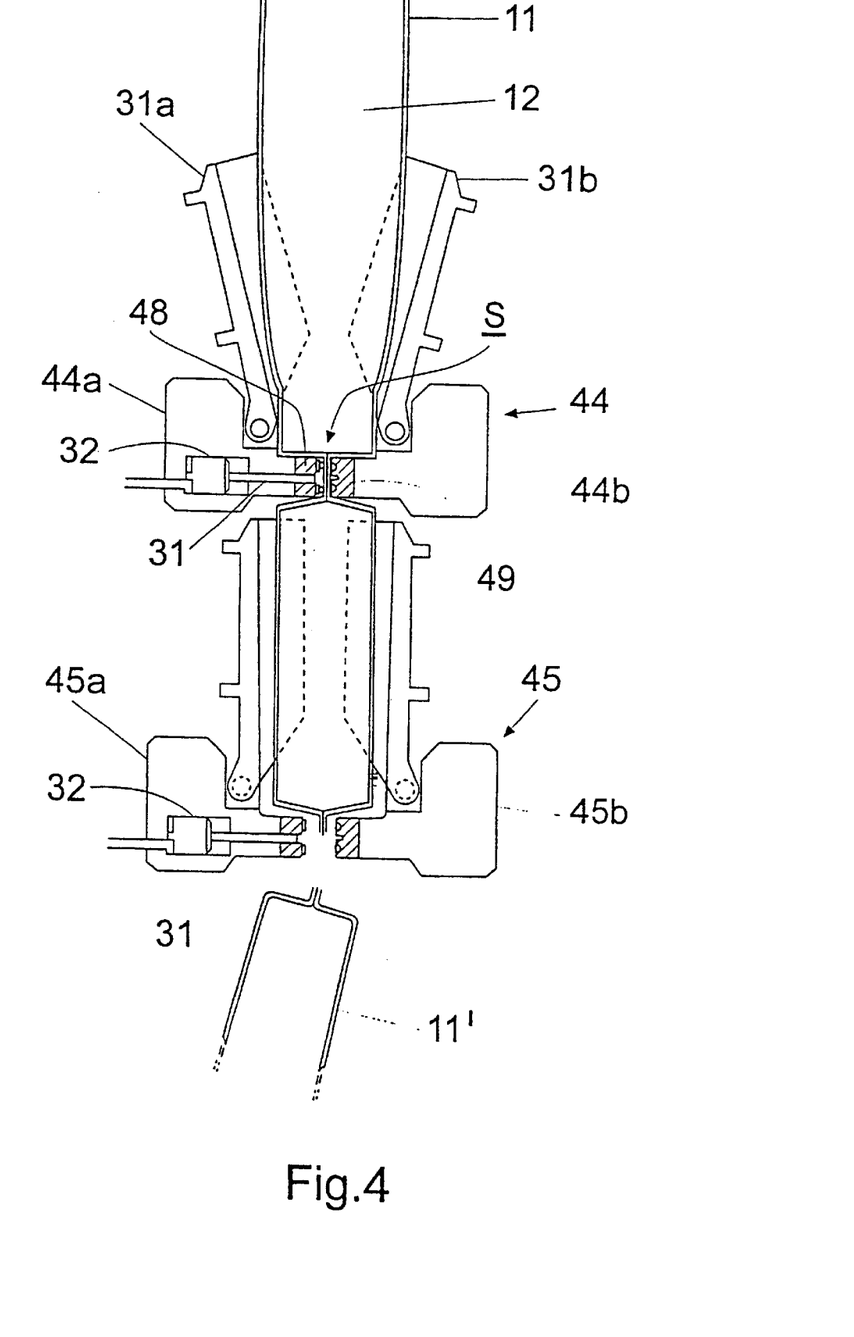
Figure 5:
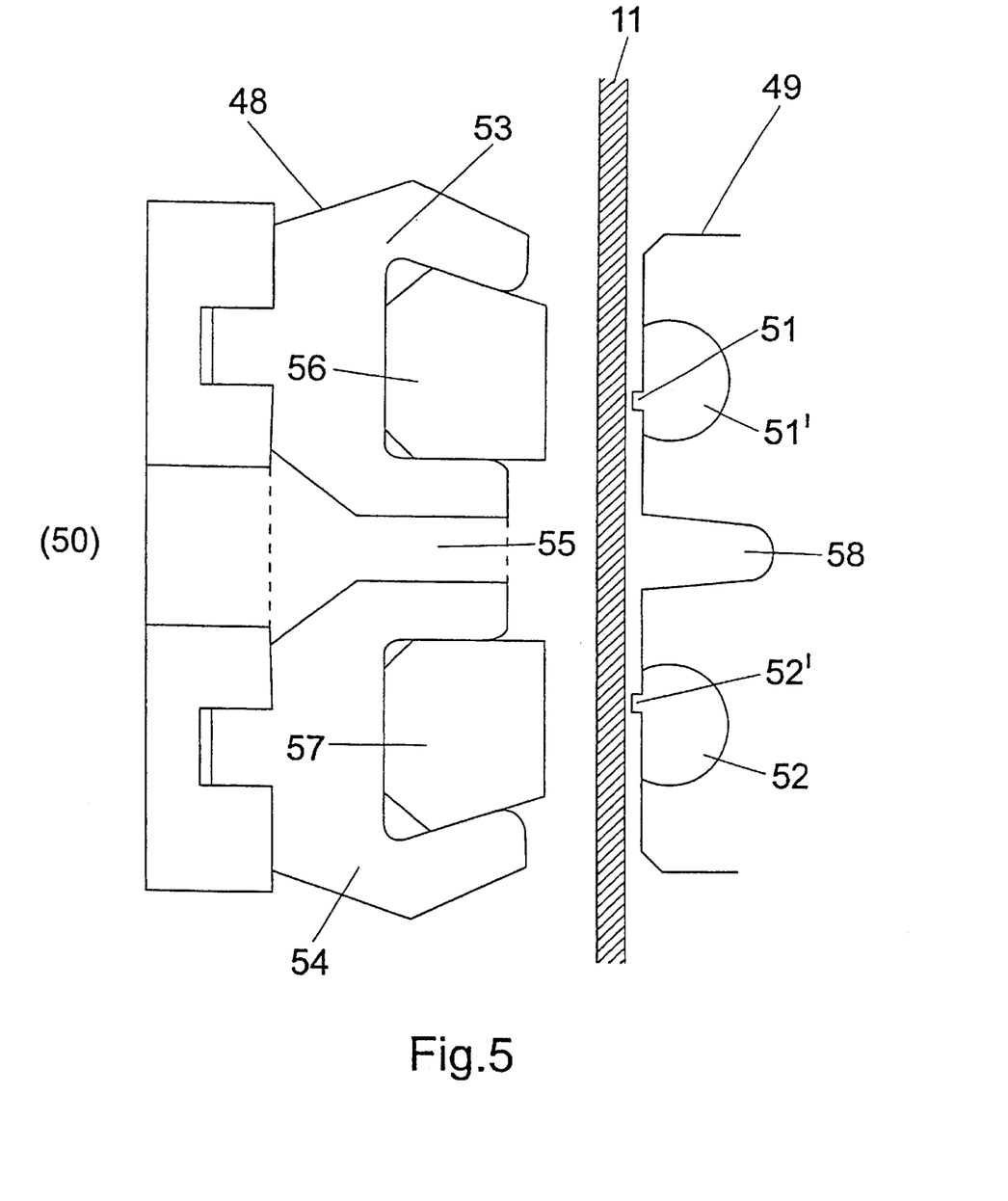
FIG. 5 shows a cross-sectional side view of an example of a counter jaw to which a pair of counter rails are attached as well as a sealing block provided with inductor coils, FIGS. 6a and 6b schematically show cross-sectional side-views of examples of a counter rail and a dolly according to the invention, and FIGS. 7a and 7b schematically illustrate two preferred embodiments of the method and apparatus by which the counter rail and dolly according to the invention is manufactured, by means of co-injection moulding.

An example of such a heat sealing apparatus is schematically shown in FIG. 4, while a cross-section view of a typical counter jaw and a heat-seal jaw is schematically shown in FIG. 5.

Conventionally, for transversal heat sealing, each counter jaw is provided with a pair of counter rails, while each heat-seal jaw is provided with a sealing block. Each counter rail and oppositely facing seal block are capable of creating one transversal heat seal across the packaging material. A cutter may be disposed in the gap formed between the two counter rails. Each cutting rail is provided with a counter element, a so-called "dolly" or "pressure pad", that extends along the counter rail, while the sealing block, in the case of induction sealing, is provided with an inductor coil disposed opposite to the dolly. Most commonly, in the case of packaging into a continuous tubular packaging material, the sealing and cutting operations are performed in the same part of the pack aging process, in which cases the counter rail is also called "cutting rail". However, it is also fully possible to separate the sealing and the cutting operations from each other, for example by subsequently cutting the filled and sealed tube in a separate cutting unit.

Figure 2:
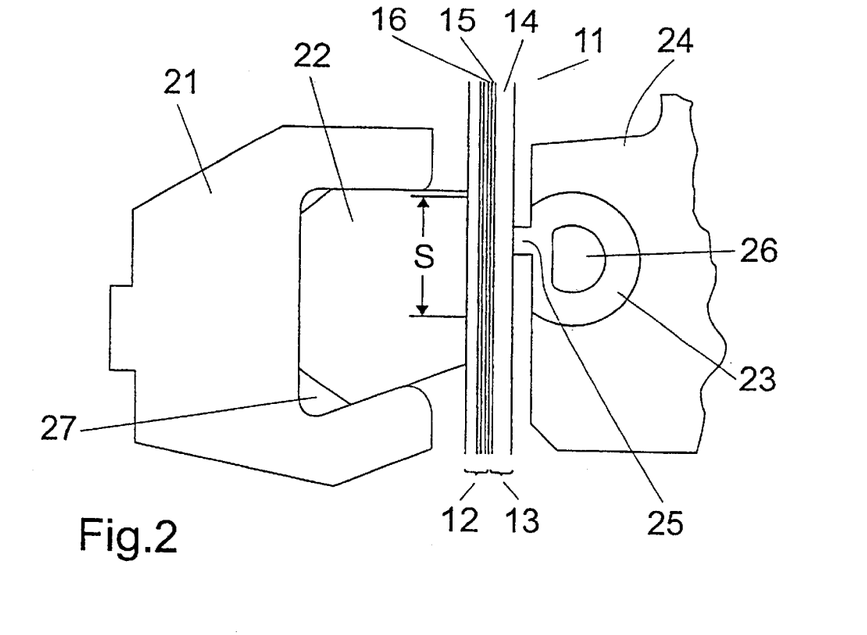
Figure 3:
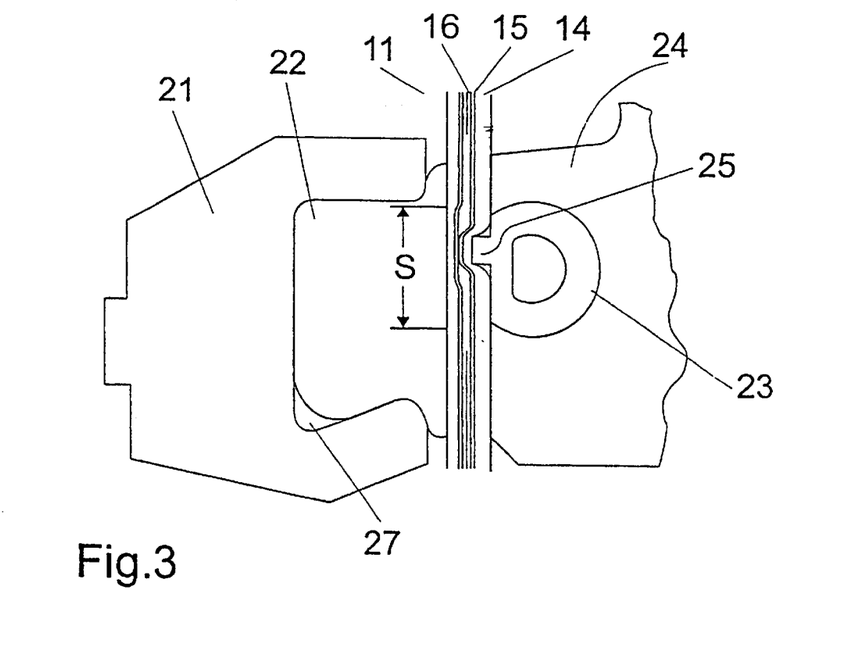

FIGS. 2 and 3, schematically illustrate a side-view of a conventional counter rail and sealing block for induction sealing, disposed on opposite sides of the packaging material to be heat sealed, before and after the sealing has been carried out.

As shown in FIGS. 2 and 3, the packaging material walls 12,13 of a tube or capsule may be placed in face to face relation to each other in a sealing zone S, for transversal induction sealing of the for example tubular packaging material 11. Each of the packaging material walls 12,13 is normally of a laminate structure made up of a paper base layer 14, and a film layer 16 of polyethylene, for example, located on the inside surface of the aluminium foil layer 15. Although not specifically illustrated, the outside surface of the paper base layer 14 is also coated with a layer of plastics material such as polyethylene. The polyethylene portions 16 of the two packaging materials 12, 13 are bonded together by heat fusion.

In other heat sealing methods, such as in high frequency (RF) sealing or heat convection sealing, an aluminium foil layer is not needed for the generation of heat.

The counter rail 21 normally is made of steel, and fulfils the requirements on planarity and parallelism. Depending on i.a. the requirements of the seal quality, the type of packaging material, the size of the package and the type of product to be packed, the shape and mechanical properties of the dolly 22 may be varied to suit the circumstances best. In the case of high quality seals as in the case of the present invention, such as for example for aseptic or long-term storage, so-called "extended shelf-life" packaging, the dolly needs to have some degree of flexibility and compressibility for control of the flow of the heated thermoplastics from the layer 16 in the seal zone S. For packages with less stringent requirements on the seal quality, the dolly may be made of a durable hard metal material, just like the counter rail.

The inductor coil 23 extends along the sealing block 24 and is normally provided with a projection 25 extending toward the counter jaws. A coolant passage 26 is formed through the inductor coil 23 to control the temperature of the inductor coil 23 as a result of coolant flowing through the coolant passage 26.

In the initial stages of the sealing process shown in FIG. 2, the packaging material 11 is placed between the sealing block 24 and the counter rail 21 with dolly 22, whereupon the counter jaw and the heat seal jaw are moved so that they approach each other. Subsequently, the counter jaw and the heat seal jaw are moved further towards each other, and the sealing portion of the packaging material 11 is pressed hard and deformed with the inductor coil 23 and the counter element 22. A high frequency voltage is applied with a power device (not shown) to cause the aluminium foil 15 to generate heat with induction current. As a result, as shown in FIG. 3, the paired polyethylene portions 16 of the packaging material facing each other and squeezed between the paired aluminium foils 15 are heated and the polyethylene portions 16 in the sealing zone S are fused. Consequently, the tubular packaging material 11 is bonded together by heat fusion.

As shown in FIG. 3, the compressible counter element 22 is deformed during the sealing stage. When the pressure from the sealing block and the counter rail is released, the counter element is resuming its original shape and is ready for the next sealing and compression operation. Such compressible counter elements are conventionally made of a plastics material with suitable mechanical and chemical properties. Today, most commonly a cross-linked polyurethane (PUR) is used for this purpose. The desired shape and configuration of the dolly is usually cut out from a cross-linked polyurethane material. The dolly of cross-linked PUR is fastened into the cutting rail of stainless, chemically resistant steel by insertion into a groove 27 extending along the counter rail 21. The configuration, hardness and compressibility of the dolly are factors of great importance to the quality of the seal, and may vary depending on the various factors listed above, i.e. required seal quality, type of packaging material, package size and product to be filled. Different shapes and hardness/compressibility proper-ties of the dolly will influence the flow of thermoplastics in the seal zone S during heat fusion differently. Furthermore, these are important factors influencing the way in which the filled product in the tube is squeezed away from the sealing zone S. Different shapes have thus proved to be optimal for different combinations of package sizes and products to be filled.

Furthermore, the plastics material used in the dolly should be resistant to chemicals (for example alkaline cleaning agents, lactic acid and other substances in various filling products and to sterilisation agents, such as for example hydrogen peroxide ($H_2O_2$).

Although the known counter rail and dolly functions quite adequately, it does have a number of disadvantages. The main drawback with this known construction is that the dolly is made of a rather soft material in relation to the cutting rail and the sealing block, and will wear out after some time and thus must be exchanged for a new one with regular intervals. Each time the dolly is changed the packaging machine has to be stopped entirely. First, the counter rail has to be removed from the counter jaw, to which it is attached during operation. Then, the old dolly, which is fastened into the groove in the counter rail, has to be removed. When the old dolly has been removed, a new fresh dolly must be inserted into the narrow groove of the counter rail and subsequently the counter rail has to be attached to the counter jaw and the machine started up again. The groove, as well as the dolly, usually has an asymmetrical cross-section configuration and it is important that the dolly is carefully fastened and secured into the groove and that it is inserted in the right position, i.e. oriented in the right way. The steps of changing the dolly take some time, since the dolly should be quite strongly fastened into the groove and the dolly, therefore, has a slightly larger cross-section than the groove. Accordingly, the dolly must be pulled out of, respectively pressed into, the groove by using some force. This is done manually, since it is a quite complicated operation. The time the machine has to be completely stopped may amount to up to about 10 minutes, including the slow-down and start-up time during which the machine is adjusted from/to normal operation speed, during which time at least 600–1300 packages could have been produced at normal production speed, depending on the type of packaging machine. Under time pressure, it is easy to insert the dolly in the wrong direction into the groove, which if not noticed in time results in that the seat quality will be decreased considerably and the machine will have to be stopped completely a second time and, thus, in considerable extra losses of efficient production time.

Furthermore, when removing the dolly from the counter rail, sometimes it is tempting to use a pointed tool such as a screw-driver in order to get grip of the dolly and pull it out. Under unfortunate circumstances, this may damage the counter rail also. Since a new counter rail of steel is quite costly, this is highly undesirable.

Another disadvantage with the known construction of the counter rail and dolly is that the two parts of the module, i.e. the counter rail and the dolly, are made of different materials having considerably different thermal expansion coefficients. Plastics normally have thermal expansion coefficients ranging from about 100 to about 200 $10^{-5}$ $mK^{-1}$, while the coefficients of metals vary from about 6 to about 10 $10^{-5}$ $mK^{-1}$. When the heat sealing is carried out and the dolly is heated, it expands much more and much faster than the counter rail at the same temperature. The dolly therefore needs some space around itself inside the groove for expansion, and also must be able to move and slide against the inside surface of the groove. Thus, the shape of the dolly is critical from several points of views, i.e. firstly for the squeezing and pressing properties in the seal zone and secondly for enabling secure attachment within the groove when cold as well as thermal expansion within the groove of the counter rail when hot. This makes the counter rail provided with a dolly a very complex module of parts, both in view of manufacturing and in view of assembling.

There is thus a need for a counter rail and a combination module of a counter rail and a dolly respectively, that is not susceptible to the disadvantages, drawbacks and problems associated with a conventional counter rail or counter rail module. In particular, it would be desirable to provide a combination of counter rail and dolly that functions equally well as conventional ones, but have the further advantages of being easily and quickly interchangeable in the sealing apparatus and packaging machine, preferably at lowered or at least maintained cost levels.

It is, therefore, an object of the present invention to provide a counter rail to be provided with a dolly and such a combination module respectively, which overcomes or alleviates the above mentioned problems.

It is accordingly an object of the invention to provide a counter rail to be provided with a dolly, which enables the operation of changing the dolly to be carried out more rapidly and shortens the duration of the break in production.

It is further an object of the invention to provide a counter rail to be provided with a dolly, which simplifies the operation of changing the dolly and thus makes it easier to carry out without making mistakes.

It is also an object of the invention to provide a counter rail and a counter rail provided with a dolly respectively, which is easy to manufacture.

According to a preferred embodiment of the invention, it is an object to provide a counter rail provided with a dolly, which eliminates the problem of assembling the counter rail and the dolly in the operation of changing the dolly.

It is a still further object of the invention to provide a cost effective combination module of counter rail and dolly, that functions well both in production and also at maintenance, i.e. in the operation of changing the dolly.

In addition, it is an object of the invention to provide a heat sealing apparatus including the counter rail provided with a dolly according to the invention as well as a packaging machine including such a sealing apparatus.

SUMMARY OF THE INVENTION

By manufacturing both the counter rail and the dolly of a plastics material, a less complex construction is achieved at the same time as the two-part module may be integrated to consist of only one single piece. The gains in productivity and cost are considerable, since the sealing apparatus of the invention operates at high speed and every reduction of the time of a production break results in significantly higher efficiency.

The counter rail and the counter rail provided with a dolly respectively, according to the invention is thus suitable for use in a sealing apparatus for transversal heat sealing of a tube of a laminated packaging material filled with a liquid or flowing product, such a sealing apparatus having at least one sealing jaw and at least one counter jaw disposed to face each other and to be movable in advancing and retracting directions for transversally sealing the sealed package, the counter rail being adapted to be included in the heat seal apparatus by being attached to the counter jaw and the dolly being disposed along the counter rail.

Preferred and advantageous embodiments of the counter rail as well as of the module of counter rail and dolly according to the invention have further been given the characterising features as set forth in claims 2–10.

Preferably, from a practical point of view in order not to have to change the counter rail and dolly too often, the plastics should be an engineering plastics having high resistance to chemicals at temperatures ranging from about 10° C. up to about 90° C., more preferably from about 5° C. up to about 100° C., most preferably from about 0° C. up to about 110° C.

Preferably the plastics involved in the counter rail according to the invention, are engineering plastics resistant to alkaline as well as acidic liquids and solutions having a pH ranging from about 2 to about 12, such as for example cleaning agents and sterilising agents normally used for the cleaning of food packaging machines. Advantageously, the plastics employed should also be resistant to hydrolysis when exposed to hot water and aqueous solutions. Furthermore, cleaning agents often contain aliphatic or aromatic solvents, which could be detrimental to some plastics materials. The plastics involved should also preferably be resistant to oil and grease in lubricants, which may be used in the maintenance of the machines. With "resistant" is meant that the desired mechanical properties are maintained for a sufficient time when in use.

Among the engineering plastics, polyamides and plastics from the group of high performance plastics (HPP) are particularly preferred. It is well known to the skilled person in the art of plastics that to the group of HPP belongs the polyetherketones, such as polyetherketone (PEK), polyetheretherketone (PEEK), polyaryletherketone (PAEK) and polyetheretherketoneketone (PEEKK), polyphenylenesulphide (PPS), liquid crystal polyesters (LCP), polyimides as well as polysulfones. These polymers generally have some chemical resistance and heat resistance along with good mechanical properties. However, LCP polymers are less preferred since they have limited resistance to hydrolysis. Furthermore, they are less suitable for injection moulding due to their anisotropic properties and morphology. Polysulfones are not preferred either, since they have only a limited resistance to oils and aromatic solvents. Polyimides have limited resistance to alkali while polycarbonates have no resistance to alkali and aromatic solvents, why these polymers also will be less suitable in a counter rail.

The skilled person further knows that to the group of engineering plastics other than the HPP'S, belong, for example, among others, the polyamides, polybutyleneterephtalate (PBT), polyethyleneterephtalate (PET), polycarbonate (PC), polyphenyleneoxide (PPO) and polyoximetylene (POM).

According to one preferred embodiment of the invention, the counter rail is made of a polyamide. Preferably, the polyamide is selected from polyamide-11 (PA-11) or polyamide-12 (PA-12) or a polyamide having similar properties. Generally, the PA-6, PA-66 and PA-46 are less preferred, because they absorb more water and have only limited resistance to acidic liquids and solutions. Polyarylamide (PAA) is not as preferable as PA-11 and PA-12, but still more advantageous than said less preferred polyamides, since they absorb less water.

According to another preferred embodiment, the counter rail is made of a HPP selected from the group consisting of PPS and the polyetherketones (PEK, PEEK, PEEKK, PAEK). The plastics employed in the counter rail according to said preferred embodiments are all resistant to hot water, acidic and alkaline solutions as well as to alcohol, aromatic and aliphatic solvents and oils. Furthermore, they absorb only a low amount of water, generally less than about 1.0%, preferably less than about 0.5%. Moreover, they are suitable and have the right flow properties and mechanical properties for the manufacturing of molded parts such as a counter rail, by means of for example injection molding. It is also important in the choice of plastics for the counter rail, that it has a high degree of dimension stability and that dimensional tolerances may be kept, equal to counter rails made of stainless steel or titanium. The counter rail should preferably have a planarity of less than 0.3 mm, more preferably less than 0.2 mm, and a parallelism of less than 0.1 mm.

According to a most preferred embodiment of the invention, the counter rail is made of reinforced, preferably glass fibre reinforced, PPS. PPS has advantageous properties with regard to chemical resistance, flame resistance, dimensional stability, durability and low water/moisture uptake.

According to a further preferred embodiment, the plastic material in the counter rail may be blended with up to about 50 weight-%, more preferably up to about 40 weight-% of a reinforcement additive, such as for example glass fibres, glass spheres and iron powder, in order to keep the dimensions within the required limits of tolerance. This may be advantageous both from the dimension stability point of view and from the point of view of mechanical properties. However, if the amount of reinforcement additive is too high, the impact strength of the plastic material may be adversely affected.

The dolly employed according to the present invention is made of a thermoplastic elastomer (TPE) having a compressibility of at least about 20% at a Shore A hardness of about 70, as well as high resistance to chemicals and to temperatures of from about 10° C. to about 90° C., preferably from about 0° C. to about 110° C.

Preferably, the dolly is made of a thermoplastic elastomer selected from the group consisting of polyurethanes (PUR), polyetherblockamides (block copolymers) (PEBA) and thermoelastic polyolefins (TPE-O). Polyurethanes may be of the polyether-type or of the polyester-type, of which the polyether-type PUR is more preferred. PUR and PEBA generally are more preferred because they are harder and have higher resistance to abrasion, as well as more adequate compressibility for the purpose of a compressible dolly. The TPE polyolefins (TPE-O) have, however, sufficient chemical and water resistance and absorb less than 1.0% water, and are resistant to temperatures of between at least about 10° C. and up to about 100° C., preferably 110° C.

The compressibility of an elastomeric material generally is depending on its hardness, and a PUR thermoplastic elastomeric material generally has a compressibility in the order of about 24% at for example a hardness Shore A of 70, while a PEBA has a compressibility in the order of about 36% at the same hardness. A TPE-O has a compressibility in the order of about 64% at the same hardness.

Most preferably, the counter rail is made of polyamide-11 (PA-11), polyamide-12 (PA-12) or PPS and the dolly of a polyurethane (PUR) of ether-type or of a polyetherblockamide copolymer, because these combinations of plastics, in addition to good mechanical properties and chemical resistance as well as temperature resistance, furthermore result in good bonding and adhesion between the contact surfaces of the plastics at the interface between the counter rail and the dolly.

These specific plastics are preferably used since they allow immediate bonding when consecutively co-injecting the two materials in order to fuse them together. The friction from the high speed of the injected plastics generates heat at the interface between the surfaces of the counter rail and the dolly to be attached to each other, thus resulting in melt-fusion between the surfaces.

Preferably, the counter rail and the dolly are manufactured by means of a co-injection moulding process. By means of so-called co-injection moulding or double injection moulding, the dolly and the counter rail may be manufactured in one operation, the whole piece thus being made of plastics materials.

A further advantage of the counter rail and dolly both being made of plastics materials is that the coefficient of thermal expansion may be matched to be nearly the same, and the difficulties with the combination of metal and plastics materials be avoided. The thermal expansion coefficients of metals and plastics are so different, i.e. ranging from 100 to 200 ($10^{-5}$ mK$^{-1}$) for plastics materials and from 6 to 10 ($10^{-5}$ mK$^{-1}$) for metals. The plastics material is swelling and expanding more than the metal and follows the temperature changes more slowly than the metal. Thus, there must be no surface bonding between a metal counter rail and a plastics dolly. The plastics dolly must be allowed to slide within the groove of the metal counter rail. This, among other factors, makes the shape of the dolly versus the groove so critical. When matching plastics of the same thermal expansion properties for the counter rail and the dolly, these difficulties are reduced or even eliminated and the shape of the dolly and it's fitting with the counter rail is thus not so critical anymore.

The counter rail and the dolly may be separately injection molded and subsequently attached to each other by means of an adhesive or by means of heat fusion, depending on the combination of plastics material and suitable adhesives available for each plastics material.

Most preferably, though, the counter rail and the dolly are consecutively injection moulded from said plastics materials in a co-injection moulding process and thus attached to each other by melt fusion, which ensures quick, cost-effective and reliable manufacturing of such modules of counter rails provided with dollies in production scale.

BRIEF DESCRIPTION OF THE DRAWINGS

Further advantages and favourable characterising features in the apparatus and method according to the present invention will be apparent from the following detailed description with references to the accompanying drawings.

Though the invention will be described herein below with particular reference to a configuration of a counter rail and the combination module of a counter rail and a dolly as well as to an apparatus, it should nevertheless be observed that, in the broadest scope, the present invention is not restricted exclusively to this practical application, selected by way of example of one among many other conceivable arrangements, for carrying out the invention as defined in the appended patent claims. In particular, different shapes and configurations of the different parts are conceivable within the scope of the invention.

In the drawings.

DETAILED DESCRIPTION OF THE INVENTION

With reference to FIG. 1a, a web-shaped packaging material 10 comprised of a flexible laminate is installed as a reel 1 in the packaging machine where it is reeled out and routed within the packaging machine using drive mechanisms (not specifically shown) disposed in several positions in the machine. A common packaging material 10 may, in the case of induction heat sealing, be formed by laminating, for example, a polyethylene layer, an aluminium foil layer, a paper base sheet, and a polyethylene layer in that order from inside to outside. The packaging material 10 is guided with the aid of a guide 2, sealed in the longitudinal direction with a sealing apparatus (not specifically shown) and formed into a tubular packaging material 11. While the tubular packaging material 11 is being transferred downward within the packaging machine, the liquid or flowing product is supplied from above through a filler pipe 3 to fill the inside of the tubular packaging material. Next, the packaging material is laterally squeezed from both sides with a counter jaw and a heat sealing jaw (not specifically shown) so that the tubular packaging material is sealed in the lateral direction at specified intervals to form interconnected, filled and sealed pillow-shaped packaging containers. Next, the sealed packaging containers are separated off, as individual pillow-shaped primary containers 11', from the tube by cutting between the laterally extending sealed portions.

With reference to FIG. 1b, pre-cut blanks of packaging material (10') are fed into the packaging machine, folded and longitudinally sealed (4), fold-formed around mandrels (5) and sealed (6) at the bottom in order to provide open package capsules (10"). The capsules are filled (7) and subsequently sealed (8) at the top, thus providing filled packages (11").

With reference to FIG. 4, a longitudinally sealed, tubular packaging material 11 is continuously fed downward and squeezed with two seal-cutting units 44, 45 at specified intervals so that opposing portions of the plastics layer are brought together and sealed in the lateral direction to form a band-like sealing zone S. The sealing zone S is then cut apart to form a primary container 11' containing a specified amount of liquid food 12. For this purpose, the seal-cutting units 44, 45 are provided with counter/cutting jaws 44a, 45a and heat sealing jaws 44b, 45b, respectively.

To increase the processing speed of the sealing apparatus, two sets of the seal-cutting units 44, 45 having an identical structure are provided and are operated in turns with their process timings staggered by a half cycle from each other.

A cutting bar 48 is provided at the fore-end of each of the cutting jaws 44a, 45a. A sealing block or inductor insulator 49 is provided at the fore-end of each of the heat-seal jaws 44b, 45b. The cutting jaws 44a, 45a and the heat-seal jaws 44b, 45b are moved towards the packaging material with the cutting bars 48 and the sealing blocks 49 to squeeze the packaging material 11 from both sides and thus bring the opposing plastics surfaces of the packaging material in contact with each other by pressing the jaws against each other, thus sealing the surfaces to each other in the lateral direction.

In the centre of each of the cutting jaws 44a, 45a is a laterally arranged flat-shaped cutter 31 that is adapted to be extended or retracted as required. The cutter 31 is arranged, when extended, to cut in the centre or intermediate portion of the sealing zone S. To effect the necessary movement of the cutter 31 between the extended and retracted positions, a cylinder 32 is provided at the rear end of the cutter 31. The cutter 31 may be extended or retracted by supplying or discharging working medium to or from the cylinder 32.

Paired flaps or shaping plates, 31a, 31b are also provided on either side of the tubular packaging material and are designed to pivot for free swinging movement relative to the cutting jaws 44a, 45a and the heat sealing jaws 44b, 45b. The flaps 31a, 31b are adapted to surround, guide, and form the packaging material 11 into a desired shape, such as for example a generally rectangular shape. The volume of the packages may be controlled by pressing the flaps together just before sealing in such a way that each package gets the same predetermined volume.

The seal-cutting unit 44, as shown in FIG. 4, is in the seal-cutting start position where the cutting jaw 44a and the heat sealing jaw 44b are moved towards the packaging material 11 to squeeze it from both sides and bring the opposing surfaces of the packaging material 11 into contact with each other. As the seal-cutting unit 44 moves downward, while squeezing and holding the packaging material 11, the sealing zone S is bonded and formed.

The seal-cutting unit 45, as shown in FIG. 4, is in the seal-cutting end position where the cutter 31 of the seal-cutting unit moves toward the sealing zone S to cut the centre or intermediate portion of the sealing zone S and separate the primary container 11' from the packaging material 11. Once the centre of the sealing zone S is cut, the cutting jaw 45a and the heat sealing jaw 45b of the seal-cutting unit 45 are retracted, rotated and raised to the seal-cutting start position. When the seal-cutting unit 45 moves to the seal-cutting start position, and the cutting jaw 45a and the heat sealing jaw 45b are moved towards the sealing zone S, the cutter 31 of the seal-cutting unit 44 moves towards the sealing zone S to effect a cut at the centre or intermediate portion of the sealing zone S, thereby separating the primary container 11' from the packaging material 11.

Although not specifically illustrated, the seal-cutting units 44, 45 are provided with cylinder mechanisms arranged to draw together the cutting jaw 44a (or 45a) and the heat sealing jaw 44b (or 45b) to impart the necessary pressing force at the time of sealing. The pressing force between the cutting jaw and the heat sealing jaw is removed in a short period of time and the seal-cutting units 44, 45 reach the seal-cutting end position.

A similar apparatus to the one shown in FIG. 4 may be conceived, which does not include the cutter and cutting operation. The jaw and rail would however have the same or a similar configuration and counteracting function, thus being a "counter jaw" and a "counter rail" respectively.

FIG. 5 illustrates various of the features associated with the cutting bar 48 and the sealing block 49. An inductor provides a pair of parallel coils 51, 52, which are embedded in the sealing block 49 so that a part of each of the coils 51, 52 is exposed on the end surface of the sealing block 49. The coils 51, 52 are connected to a power source through a connecting part.

A groove 58 is formed in the sealing block 49 and is located between the two coils 51, 52. This groove 58 extends along the sealing block 49 and is designed to accommodate the fore-end of the cutter 31 when it is extended.

The coils 51, 52 are respectively formed with a raised portion 51', 52' that forms a first pressing portion. The raised portions 51', 52' extend towards the cutting bar 48 and are disposed in the longitudinal direction of the inductor coils 51, 52.

The cutting bar 48 is provided with paired cutting rails 53, 54. The cutter 31 is adapted to move within a gap 55 defined between the cutting rails 53, 54.

Each of the cutting rails 53, 54 is provided with a counter element or so-called dolly 56,57 that extends along the cutting rails. Each counter element 56, 57 is mounted in a groove in the respective cutting rail. The sealing zone S of the tubular packaging material 11 is pressed hard with the counter elements 56, 57. For this reason, the counter elements 56, 57 are made of a rubber material having a certain extent of compressibility. In addition, each of the counter elements 56, 57 has a front surface that faces the sealing block 49. As shown in FIG. 5, the front surface of each of the counter elements is flat or planar.

The seal block 49 is connected to a power circuit or voltage applying device so that a high frequency voltage generated by the power circuit is applied to the inductor. When the high frequency voltage is applied to the seal block 49 an electric field which changes according to the high frequency voltage is formed between the seal block 49 and the aluminium foil in the packaging material. As a result, an eddy current is produced in the aluminium foil which generates heat by eddy current loss.

In a sealing apparatus which does not include the cutting operation, as mentioned above, a configuration in which one bigger counter rail is provided with two dollies in order to produce the same pair of seal zones S is possible. The counter rails 53, 54 in FIG. 5 may then be produced as one counter rail part only, thus eliminating the cutter gap 55 along the dotted lines in the figure, and having two parallel grooves for insertion of the dollies 56, 57.

With reference to FIGS. 4 and 5, the counter rail and dolly according to the invention may be arranged for transversal heat sealing. It is, however, alternatively conceivable according to the invention to adapt a sealing apparatus and packaging machine for longitudinal heat sealing along a tube or a capsule of the packaging material, employing the counter rail and dolly of the invention.

The configuration and the hardness and flexibility properties of the dolly plays an important role for the resulting quality of the transversal seals in a package. In addition, the relative movements when pressing together the heat seal jaw and counter/cutting jaw in the sealing operation, i.e. the sealing jaw press and clutch movements of the jaws, are other important factors for the resulting seal quality. As explained above, the extent and direction of flow of plastics may be optimised by adjusting these parameters. Especially in aseptic packaging the thermoplastics should be heat fused in the sealing zone but not be allowed to escape from the sealing zone, in towards the filled product. If the plastics is allowed to escape, plastics lumps outside of the seal zone S will be formed due to the outflow of the resin and the bond strength in the sealing zone may be undesirably lowered due to the lower amount of plastics contributing to heat fusion within the sealing zone.

Furthermore, the filled product should be gently pressed away from the seal zones and from the area between the two parallel seal zones. It is particularly important in aseptic packaging that no filling product remains in the area between the two adjacent sealing zones, along which the packages are cut off from the tube. Remaining food product in the packaging material extending from the cut edge of the package, would promote growth of fungus and bacteria and generate hygienic problems in the subsequent handling and distribution while transporting and in shops. In addition, leakage and dripping of superfluous food product in and around the sealing unit of the packaging machine would necessitate extra cleaning and sterilisation procedures in the packaging process.

The transversal seals of the packages are thus made two at the time—the top seal of a first package and the bottom seal of a second package in the longitudinally arranged filled tube.

Accordingly, there are two parallel coils, each having a ridge for making a crease on the one side of the transversal seal and for pressing away the packaged food product from the line-shaped sealing zone. The two inductor coils with ridges are located on the heating jaw, whereas a corresponding counter rail or counter rails with dollies, for counteracting the pressure from the heating jaw, are located on the counter jaw. The counter jaw and the heating jaw are in each seal operation pressed together with the packaging laminate in between, by such pressure that heat fusion occurs. The heating jaw heats up the sealing zone, thus fusing the heat-sealing plastics together across the contact interfaces of the packaging laminate. Subsequently, the inductor is rapidly cooled in order to make the plastics stay in its fused state and a knife may be forwarded to cut off the lower package along the region between the two parallel sealing zones.

Although the invention is described particularly in relation to induction heat sealing, the counter rail provided with a dolly according to the present invention may be employed also in other heat sealing technologies, such as for example heat sealing by means of high frequency radio waves (RF) or by heat convection sealing. Generally a seal of lower quality is obtained by heat convection sealing, which would thus not be considered for aseptic packaging and sealing processes requiring very high seal quality. Mostly, the counter/ cutting rail in heat convection sealing is made of metal. However, the seal quality in heat convection sealing may still be improved by using a dolly of plastics material as according to the present invention, for some uses. Also in RF-sealing and the like, the sealing block may be exchanged for a piece for providing high frequent radiation, while the counter rail and dolly parts are essentially the same as in induction sealing.

Figure 6A:
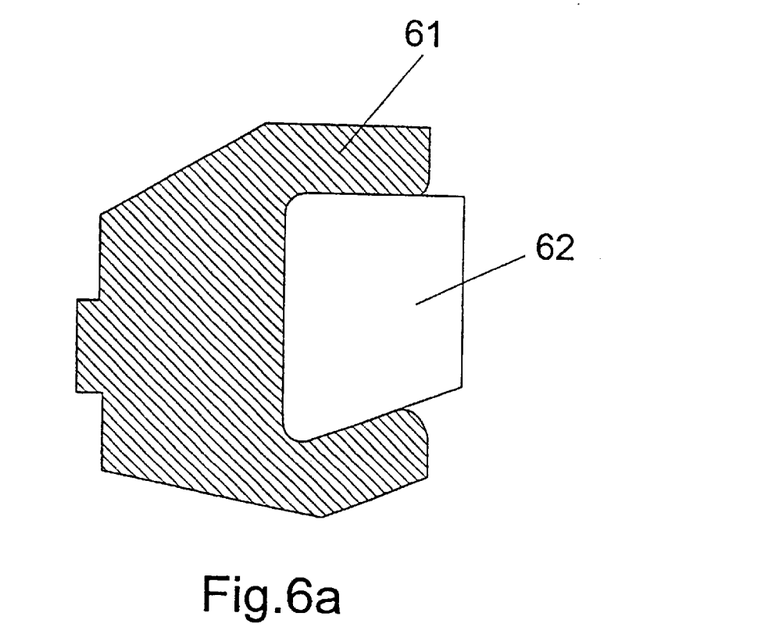
Figure 6B:
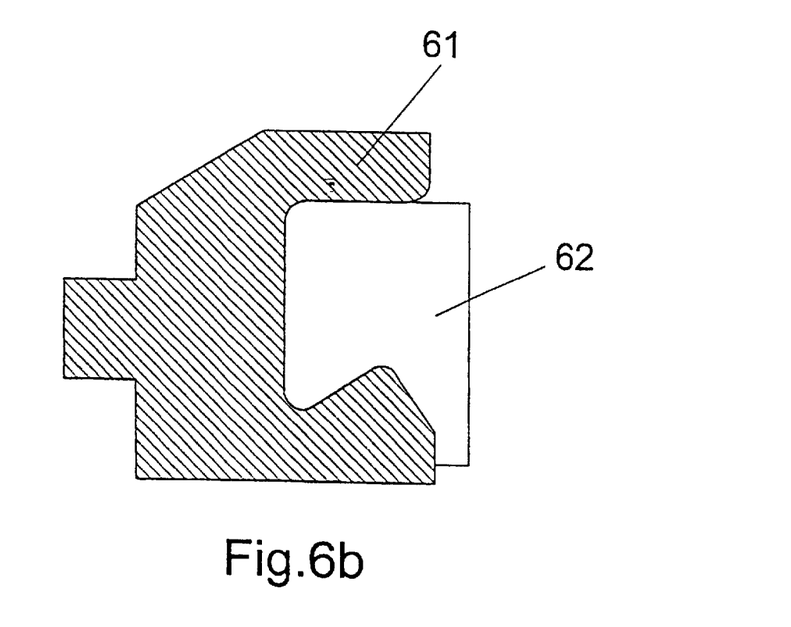

With reference to FIGS. 6a and 6b, a counter rail 61 is manufactured from one of the engineering or high performance plastics, which have the required chemical resistance as well as temperature resistance. Preferably, the counter rail is made of PPS, PA-11 or PA-12, most preferably of reinforced PPS.

The dolly 62 is manufactured from a TPE having the required mechanical, chemical and thermal properties, such as preferably a PUR TPE, a et polyetherblockamide or a thermoplastics polyolefin elastomer, most preferably a PUR or a polyetherblockamide TPE.

Different cross-section configurations of the counter rail and of the dolly are conceivable within the scope of the invention. The shape of the counter rail and dolly may thus be optimised in relation to each other from case to case, in view of different package sizes, filling products and packaging materials. FIGS. 6a and 6b show two examples of possible configurations of the cutting rail and dolly according to the invention.

Figure 7A:
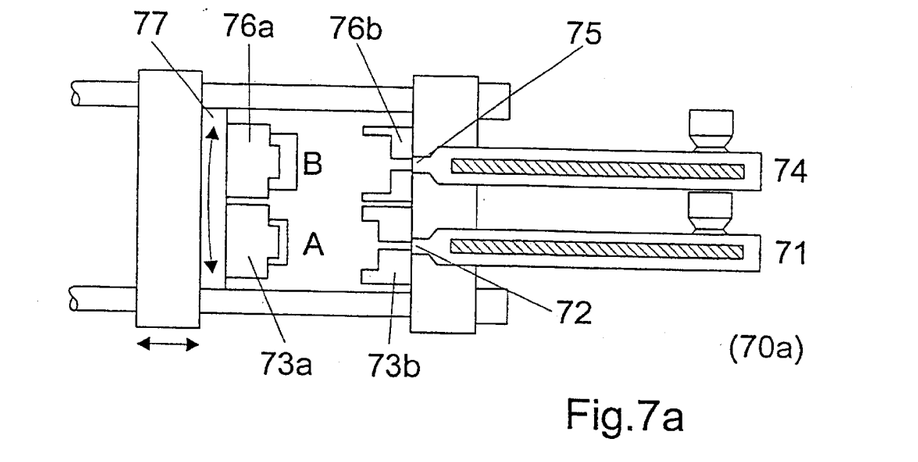
Figure 7B:
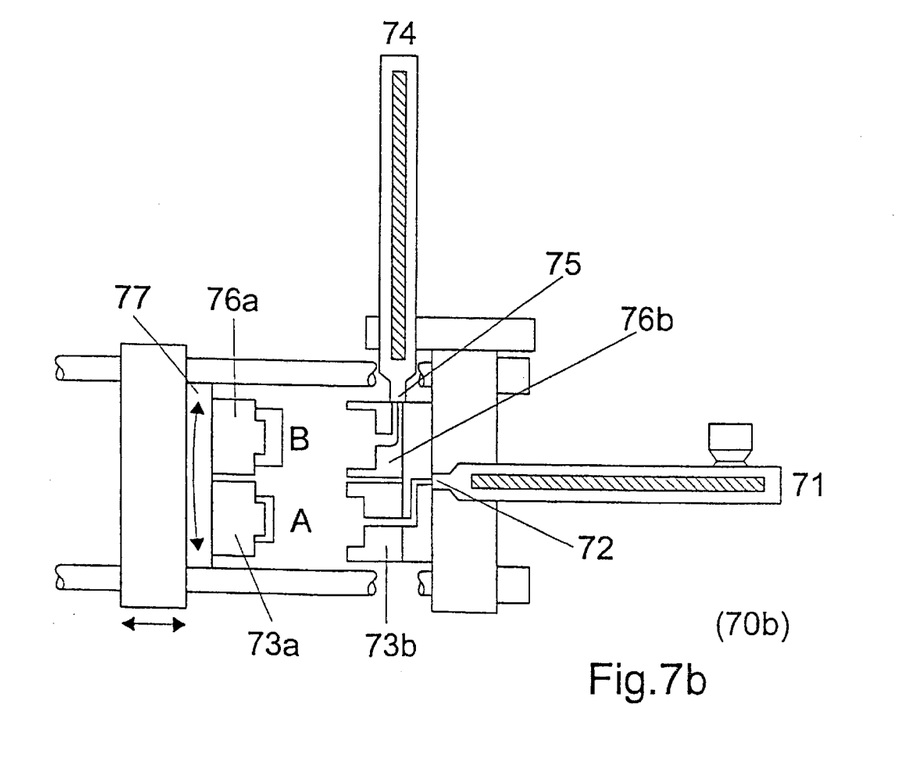

FIGS. 7a and 7b each schematically describe a co-injection moulding process according to the invention.

The suitable plastics for manufacturing of the counter rail, such as preferably PA-11 or PA-12 is melted and fed by an injection unit 71 to a first injection inlet 72 to a first mould 73, consisting of two mould halves 73a, 73b for moulding of the counter rail A. During injection of the plastics into the mould 73 and subsequent cooling and solidification of the molten plastics, the mould halves are put together in a closed position, i.e. the mould half 73a has been moved forward to the right in the drawing, towards the injection unit and the mould half 73b. The injected plastics solidifies into a moulded counter rail A, attached to the mould half 73a. The section 77 on which the mould half 73a is secured, rotates one step towards a following second injection unit 74, injection inlet 75 and mould 76. Similarly, the TPE plastics suitable for manufacturing of the dolly, such as preferably PUR or polyetherblockamide, is melted and fed by the injection unit 74 and injected into the mould 76, while the mould halves 76a and 76b are put together in the closed position. The counter rail A, is now provided with and attached to an injection moulded dolly, thus resulting in a co-moulded part B. The co-injection moulded part B is left to solidify and finally removed from the co-injection moulding apparatus 70. Since the moulds 73 and 76 can rotate and thus shift between the two injection units 71 and 74, the moulding steps may be carried out very quickly after each other, which enables the two plastics of the counter rail and the dolly to bond by heat fusion at the interface between them.

In the case of a counter rail being provided with two dollies, a further co-injection step is added for injection of the second dolly into the second groove of the counter rail.

Accordingly, the invention as described above provides a counter rail as well as a combination module of a counter rail and a dolly suitable for use in a sealing apparatus for heat sealing of a laminated packaging material in the process of packaging of a liquid or flowing product, the sealing apparatus having at least one sealing jaw and at least one counter jaw disposed to face each other and to be movable in advancing and retracting directions for sealing a package, which counter rail and module of counter rail and dolly respectively, provides a simple and cost-effective way of reducing the duration of production breaks in the packaging process due to maintenance and changing of the worn-out dollies as well as reducing the risk for mistakes to occur due to a complex configuration of the counter rail and dolly.

Furthermore, a method of manufacturing of the module of counter rail and dolly of the invention is provided, which enables a cost-effective and reliable manufacturing of modules of counter rails provided with dollies, as defined above, in production scale.

What is claimed is:

1. Counter rail and at least one dolly, the dolly fitted with or adapted to be fitted with said counter rail, for heat sealing a laminated packaging material in the area of said dolly for packaging of a liquid or for packaging of a flowing product, the laminated packaging material including a core layer and outer heat sealable layers, wherein said counter rail and said dolly each are made substantially of a plastics material.

2. Counter rail and dolly according to claim 1, wherein said counter rail is made of an engineering plastics having high resistance to chemicals and temperatures of from about 10° C. to about 90° C.

3. Counter rail and dolly according to claim 2, wherein said counter rail is made of a polyamide or of a high performance plastics (HPP) having high resistance to chemicals and temperatures of from about 10° C. to about 90° C.

4. Counter rail and dolly according to claim 2, wherein said counter rail is made of a polyamide or of a high performance plastics (HPP) having high resistance to chemicals and temperatures of from about 5° C. to about 100° C.

5. Counter rail and dolly according to claim 2, wherein said counter rail is made of a polyamide or of a high performance plastics (HPP) having high resistance to chemicals and temperatures of from about 0° C. to about 110° C.

6. Counter rail and dolly according to claim 1, wherein said counter rail is made of a plastics selected from a group consisting of polyamide-11 (PA-11), polyamide-12 (PA-12), polyarylamide (PAA), polyphenylenesulphide (PPS), polyetherketone (PEK), polyetheretherketone (PEEK), polyaryletherketone (PAEK) and polyetheretherketoneketone (PEEKK).

7. Counter rail and dolly according to claim 1, wherein said counter rail is made of a composition comprising said plastics and up to about 50 weight-% of a reinforcement additive.

8. Counter rail and dolly according to claim 7, wherein the reinforcement additive is selected from a group consisting of glass fibres, glass spheres and iron powder.

9. Counter rail and dolly according to claim 1, wherein the dolly is made of a thermoplastic elastomer having a compressibility of at least about 20% at a Shore A hardness of about 70, as well as high resistance to chemicals and to temperatures of from about 10° C. to about 90° C.

10. Counter rail and dolly according to claim 1, wherein the dolly is made of a thermoplastic elastomer selected from a group consisting of polyurethane (PUR), polyetherblockamides (PEBA) and thermoelastic polyolefins (TPE-O).

11. Counter rail and dolly according to claim 1, wherein the counter rail is made of polyamide-11 (PA-11), polyamide-12 (PA-12) and the dolly of a polyurethane (PUR) of ether-type or of a polyetherblockamide (PEBA).

12. Counter rail and dolly according to claim 1, wherein the counter rail is made of reinforced polyphenylensulfide (PPS) and the dolly of a polyurethane (PUR) of ether-type.

13. Counter rail and dolly according to claim 1, wherein the counter rail and the dolly are made by means of a co-injection moulding process.

14. Counter rail and dolly according to claim 1, wherein said counter rail is made of an engineering plastics having high resistance to chemicals and temperatures of from about 5° C. to about 100° C.

15. Counter rail and dolly according to claim 1, wherein said counter rail is made of an engineering plastics having high resistance to chemicals and temperatures of from about 0° C. to about 110° C.

16. Method of producing a counter rail and dolly, wherein said counter rail and said dolly each are injection moulded from a plastics material and attached to each other.

17. Method according to claim 16, wherein said counter rail and said dolly are consecutively injection moulded from said plastics materials in a co-injection moulding process and attached to each other by melt fusion.

18. Apparatus for heat sealing a laminated packaging material including a core layer and outer heat sealable layers for packaging of a liquid or for packaging of a flowing product, having a sealing jaw and a counter jaw disposed to face each other and to be movable in advancing and retracting directions to press against each other and for heat sealing the packaging material, the counter jaw including at least one counter rail and at least one dolly disposed and fitted along each counter rail for said heat sealing to take place in the area of the dolly, wherein said counter rail and said dolly each are made substantially of a plastics material.

19. A sealing/cutting apparatus having a counter jaw and a heat sealing jaw which are disposed to face each other and to be movable in advancing and retracting directions for sealing and cutting opposing portions of a packaging material including a core layer and outer heat sealable layers, said apparatus comprising:

a) a pair of counter rails disposed in said counter jaw;

b) a cutter which is disposed in a clearance formed between the counter rails to be movable in advancing and retracting directions and which cuts said packaging material at the opposing portions when advanced;

c) dollies disposed along respective counter rails; and d) a pair of heating bodies which are disposed in said heat sealing jaw for squeezing and sealing the opposing portions of said packaging material in co-operation with the dollies, and which form a groove there between to accommodate the tip of said cutter when said cutter is advanced, wherein said counter rails and said dollies each are made substantially of a plastics material.

20. Packaging machine for packaging of a liquid or flowing product, at least comprising means for forming packages from a laminated packaging material including a core layer and outer heat sealable layers for packaging of a liquid or for packaging of a flowing product, means for filling the packages with said product and means for sealing the packages, said sealing means including a sealing jaw and a counter jaw disposed to face each other and to be movable in advancing and retracting directions to press against each other and for heat sealing the packaging material, the counter jaw including at least one counter rail and at least one dolly disposed and fitted along each counter rail for said heat sealing to take place in the area of the dolly, wherein said counter rail and said dolly each are made substantially of a plastics material.

* * * * *